(12) United States Patent
Steiner

(10) Patent No.: US 6,799,430 B2
(45) Date of Patent: Oct. 5, 2004

(54) ATMOSPHERE WATER RECOVERY

(75) Inventor: Walter Georg Steiner, Stuttgart (DE)

(73) Assignee: Donna J. McClellan, Williamsville, NY (US); part interest ( * ) Notice: Subject to any disclaimer, the term of this patent is extended or adjusted under 35 U.S.C. 154(b) by 0 days.

(21) Appl. No.: 10/276,661

(22) PCT Filed: May 18, 2001

(86) PCT No.: PCT/DE01/01899
§ 371 (c)(1),
(2), (4) Date: May 5, 2003

(87) PCT Pub. No.: WO01/88281
PCT Pub. Date: Nov. 22, 2001

(65) Prior Publication Data
US 2003/0167779 A1 Sep. 11, 2003

(30) Foreign Application Priority Data
May 19, 2000 (DE) .......................... 100 24 414

(51) Int. Cl.[7] .................. F25D 17/06; F25D 23/00; B01D 53/02
(52) U.S. Cl. ................... 62/93; 62/271; 95/117
(58) Field of Search .............. 62/93, 271, 92, 62/94, 238.3; 95/124, 117, 120

(56) References Cited

U.S. PATENT DOCUMENTS

| 4,185,969 A | * | 1/1980 | Bulang | 95/120 |
| 4,342,569 A | * | 8/1982 | Hussmann | 95/124 |
| 6,116,034 A | * | 9/2000 | Alexeev et al. | 62/92 |

FOREIGN PATENT DOCUMENTS

| DE | 19632272 A | * | 2/1996 |
| DE | 4430901 C | * | 5/1996 |
| RU | 2000393 C1 | | 9/1993 |
| RU | 2004719 C1 | | 12/1993 |
| WO | WO 99/11927 A | * | 3/1999 |
| WO | WO 99/43997 A | * | 9/1999 |

* cited by examiner

Primary Examiner—Chen Wen Jiang
(74) Attorney, Agent, or Firm—William H. Eilberg

(57) ABSTRACT

A method for reclamation of atmospheric water uses a water reclamation chamber (1) with water reclamation cells (2) and variable high-performance blowers (3). In this occurs by means of cooling collectors (6) during the nighttime the cooling of a coolant stored in a cooling resorvoir (7), and during the daytime operation by means of solar collectors (8) occurs the heating of a further fluid stored in a heat reservoir, so that the coolant that is cooled during the night for the purpose of water reclamation cools by day and/or night the cooling registers through which air flows. At these cooling registers, the air is dehumidified so that the heat-accumulating fluid by day and/or by night is used for the generation of energy for the operation of the equipment and/or for the extraction of water.

34 Claims, 9 Drawing Sheets

ATMOSPHERE WATER RECOVERY

DESCRIPTION

Figure 1:
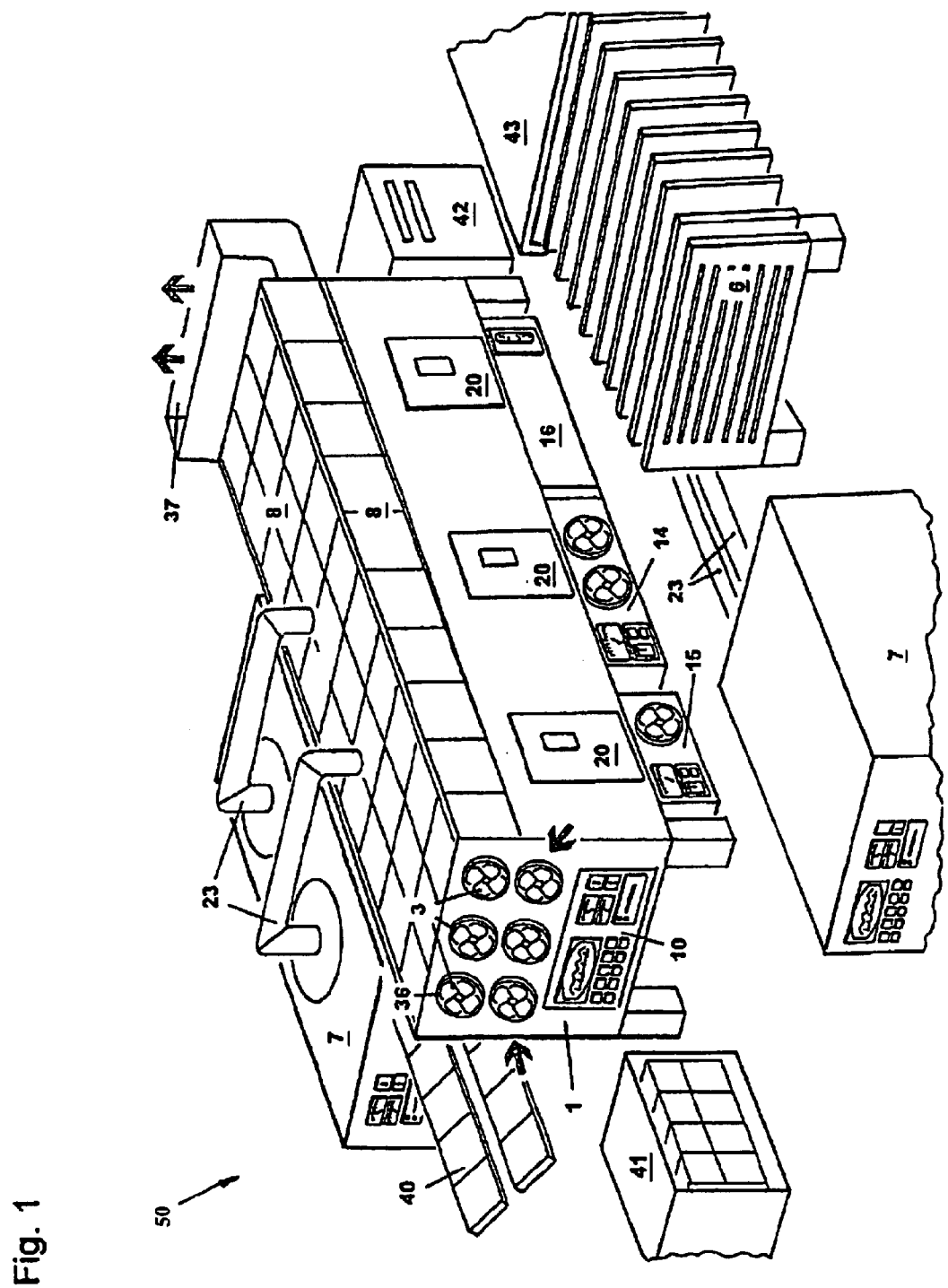

The invention concerns a method and a device for the reclaimation of atmospheric water.

STATE OF THE TECHNOLOGY

As far as the relative humidity is concerned, contrary conditions exist, depending on seasons and regions, in Arabic, African, Asiatic and Southern European countries. During the day, there is in parts a very high and in parts a very low relative atmospheric humidity in the various countries.

In contrast, during the nighttime, in the interval between sundown and sunrise with falling temperatures (around the 32° F. mark), the relative atmospheric humidity rises in almost all countries almost steadily up to 100%. That is why the inhabitants of these regions employ well tried but antiquated implements. In order to be able to meet at least the absolutely minimum demand in drinking water, they attach stones to trees and shrubs or walls, which are heated during the day by the sun and on which during the night the relative atmospheric humidity condenses. Likewise small amounts of water are retrieved from the atmosphere during the nighttime in plastic or aluminum foils and the like, which are stretched in a concave shape.

In the interim, machines/devices are known with which one extracts small amounts of water from the atmosphere according to the condensation principle. Methods with machines/devices with which one extracts large amounts of water from the atmosphere, with renewable energies, in a targeted way, efficiently, and calculable in advance, around the clock, in day- and nighttime operation with the use of cooling and heating registers, are not known. The descriptions refer mainly to functional technologies. Clear definitions, with which large amounts of water are extracted from the atmosphere, in daytime operation with cooling and in nighttime operation with heating, around the clock, in a targeted way, efficiently, and calculable in advance, cannot be learned from these descriptions.

The functions and technologies of these known machines are described in the below-mentioned specifications and patent applications as follows:

1. U.S. Pat. No. 4,433,552
2. U.S. Pat. No. 5,301,516
3. Specification No. DD 285142 A 5/E 03 B 3/28
4. Disclosure document DT 25 35 668/F 25 J 3/00
5. Disclosure document DE 3208 964 A 1/E 03 B 3/28
6. Disclosure document DE 3311 711 A 1/E 03 B 3/283
7. Disclosure document EP 0597716 A 1/E 03 B 3/28
8. Disclosure document RU 20 00 393 C/E 03 B 3/28
9. Disclosure document RU 2004719 C 1/E 03 B 3/28
10. Disclosure document No. 80 26 660/24 96 080/E 03 B
11. Patent application No. 19737483.2-11

PURPOSE AND ADVANTAGES OF THE INVENTION

The underlying purpose of the invention is to develop a method and a device which by day and night utilizes the alternative energy sources that are available in dry regions for the reclamation for water; in particular, a machine/device for the reclamation of atmospheric water shall be created with which, using renewable energies, during the daytime with cooling systems and during the nighttime with heating systems the high relative atmospheric humidity is absorbed and in a targeted way, efficiently and calculable in advance, around the clock large amounts of water are extracted from the atmosphere, which serve for the population's supply of drinking and service water as well as for irrigation.

Pursuant to the invented method, both cooling energy and heat energy are utilized for the reclamation of water from the atmosphere. Herein lies an advantage over known machines in particular through the use of heat energy, which in dry regions is generally abundant during the daytime. Thus, through the storage of heat energy collected during the day, a solar chimney (or upwind) power station for the generation of electric energy is operated during the night, whereby the electric energy finds application for the cooling of a coolant, which by means of cooling registers is utilized for the dehumidification of the air. Furthermore, the invention envisions to designate the heat energy during the night also for the generation of air currents and thereby economize the electric energy for the operation of ventilators which blow the air that is supposed to be dehumidified through the cooling registers.

The advantage of this machine/device for the reclamation of atmospheric water is that it can be used in arid countries and regions, as for instance in karstlands (rocky deserts), desert regions and remote settlements, i.e. in regions where there is little or no precipitation which could supply these with water for drinking and domestic use as well as for irrigation.

The same applies to regions whose groundwater table has sunk so low that contaminations threaten or are already present, or which cannot be reached by the pipelines of desalination plants, or whose water supply by tank trucks is too costly.

Beyond this, the machine/device for the reclamation of atmospheric water is designed to provide the service water supply in tourist centers (e.g. for bathrooms, toilets, and swimming pools). Through the use of this machine/device the groundwater resources are disencumbered considerably, as to this day approximately 75% of the valuable groundwater is wasted on irrigation.

A great advantage is that with this machine/device the atmospheric water cycle is closed. After the irrigation, the water extracted from the atmosphere evaporates again into the atmosphere, is extracted again, evaporates again, and so on.

A further advantage of this machine/device for the reclamation of atmospheric water is that with renewable energies, combined cooling and heating systems are run which make the 24-hour night and day operation of the machine/device possible. The coolants are cooled during the night with cooling collectors, are stored aboveground or belowground out of the way in multi-chamber thermo-reservoirs and during the daytime-operation are fed to the cooling registers.

In the same way, explosion-proof boiling oils or other heat-accumulating fluids are heated during the day with solar collectors, are stored aboveground or belowground out of the way in multi-chamber thermo-reservoirs and during the nighttime-operation are fed to the heating registers. Through the use of renewable energies, the entire process of water reclamation requires no conventional energies. The power demand for the continuously variable high-performance blowers, circulating and dosing pumps, the electronic control as well as the regulation and measuring instruments etc. is supplied by photo-voltaic equipment. A battery station, which is fed by the photo-voltaic equipment, supplies the energy for the nighttime operation. Thereby the machine/device is completely network-independent and can be installed at any place at all, in the desert, mountains etc.

As far as the size/dimension and output are concerned, the machine/device can be adapted individually to any water demand.

Further advantages and details of the invention become evident in the drawings and are more closely explained in the construction examples (embodiments) that are illustrated subsequently.

DISPLAYED IS IN

Figure 2:
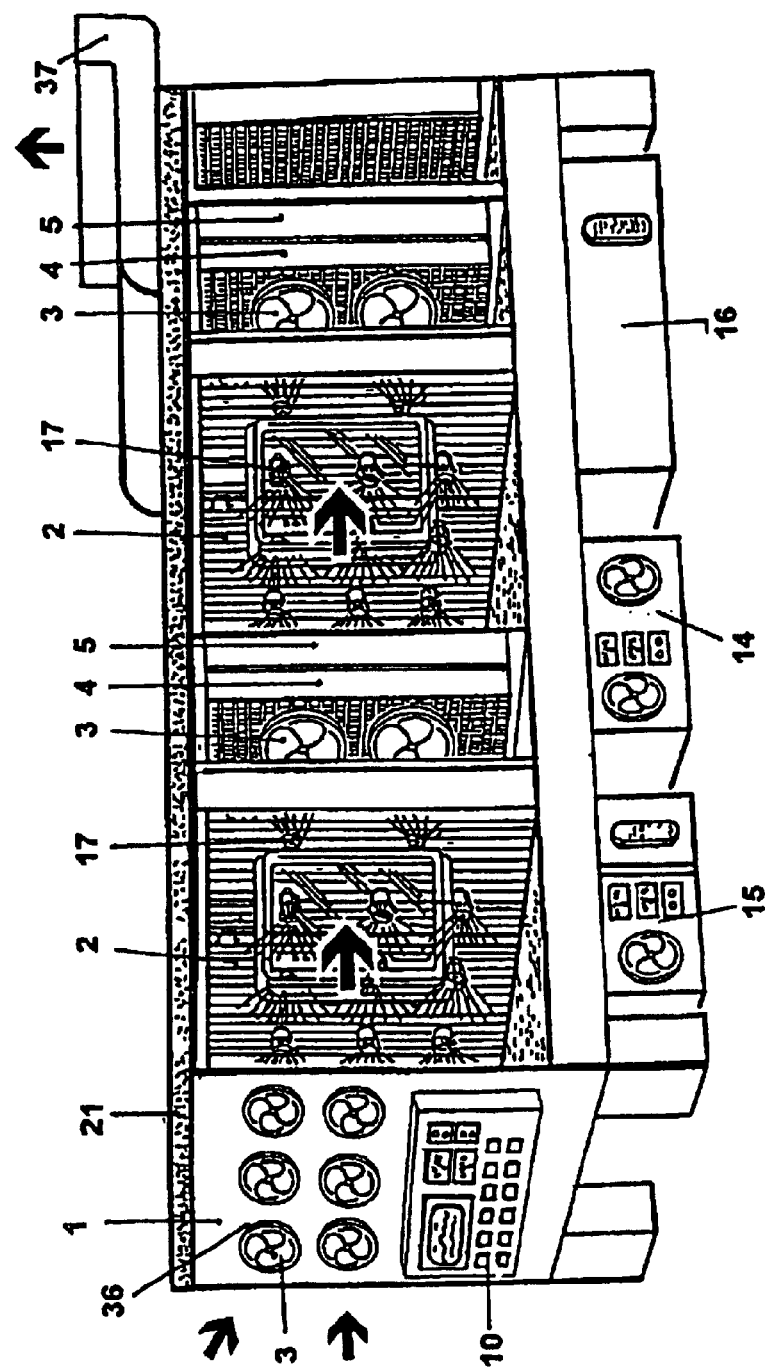
Figure 3:
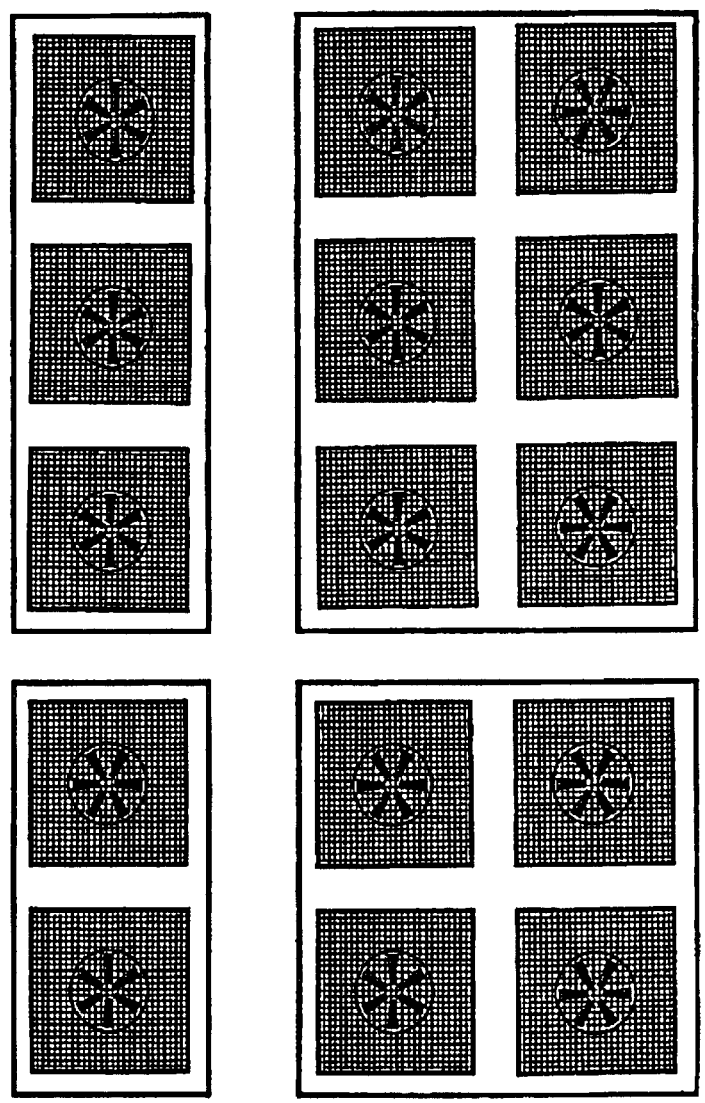
Figure 4:
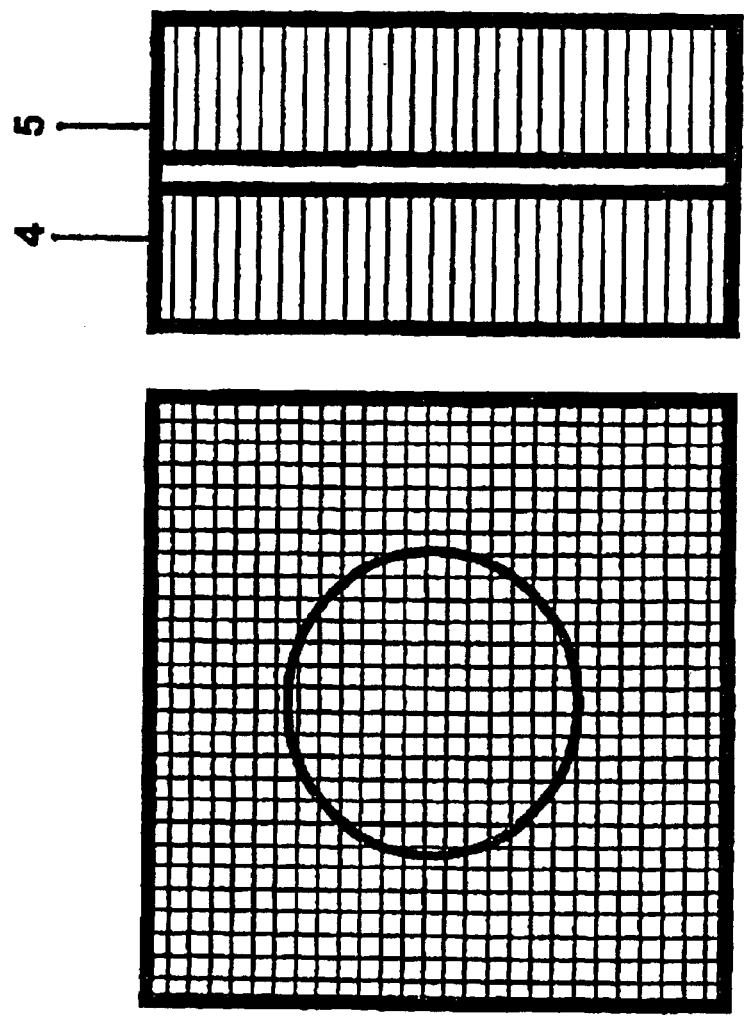
Figure 5:
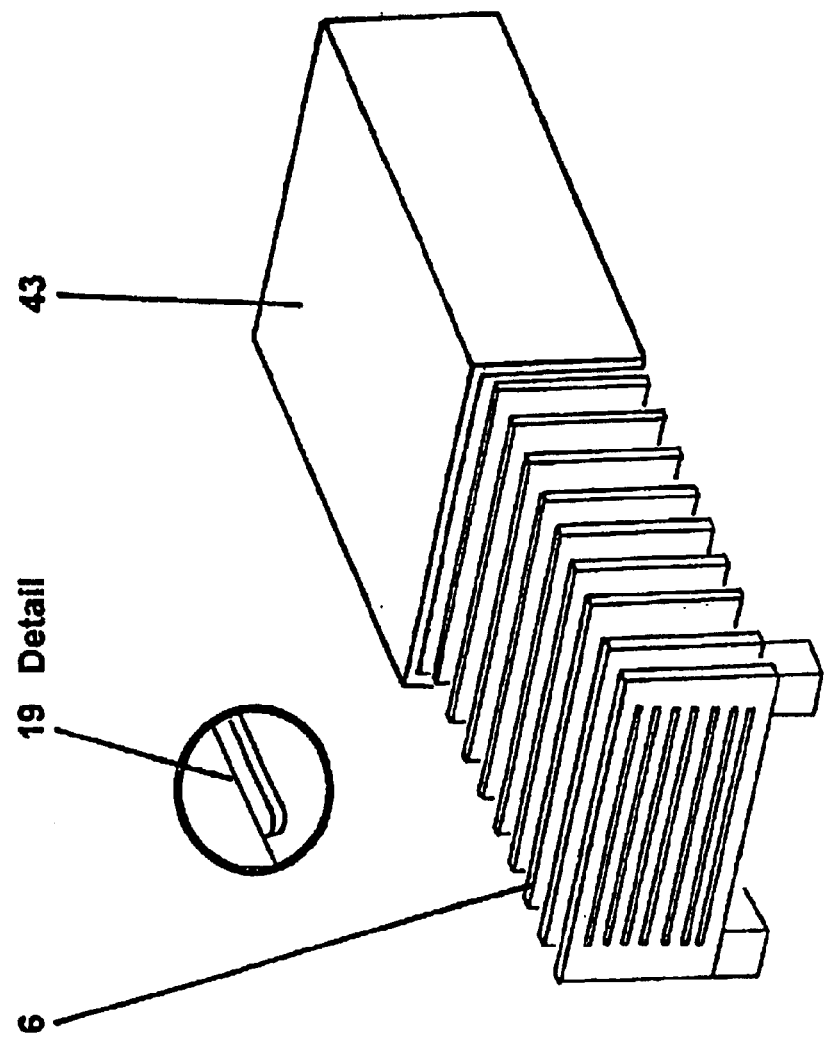
Figure 6:
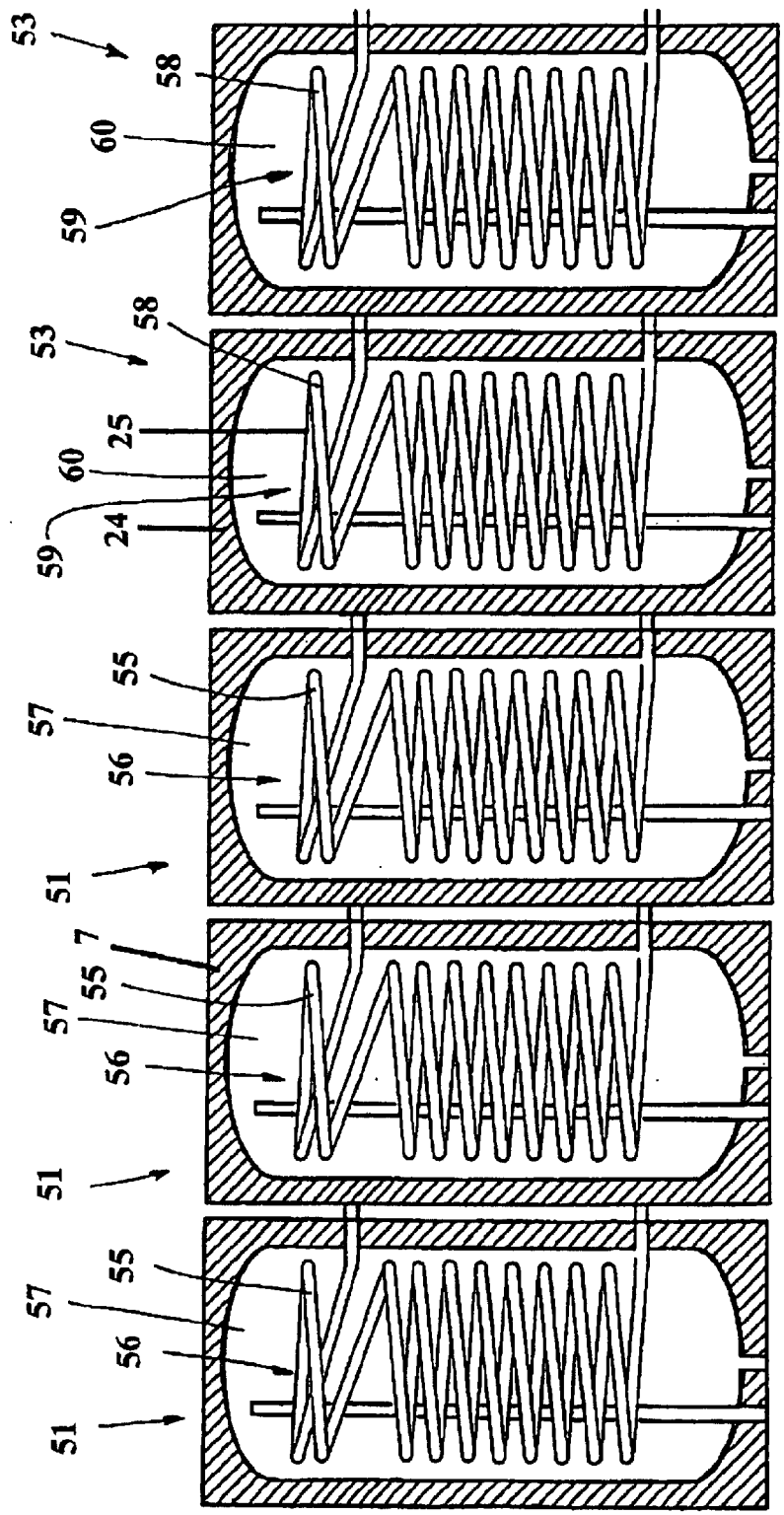
Figure 7:
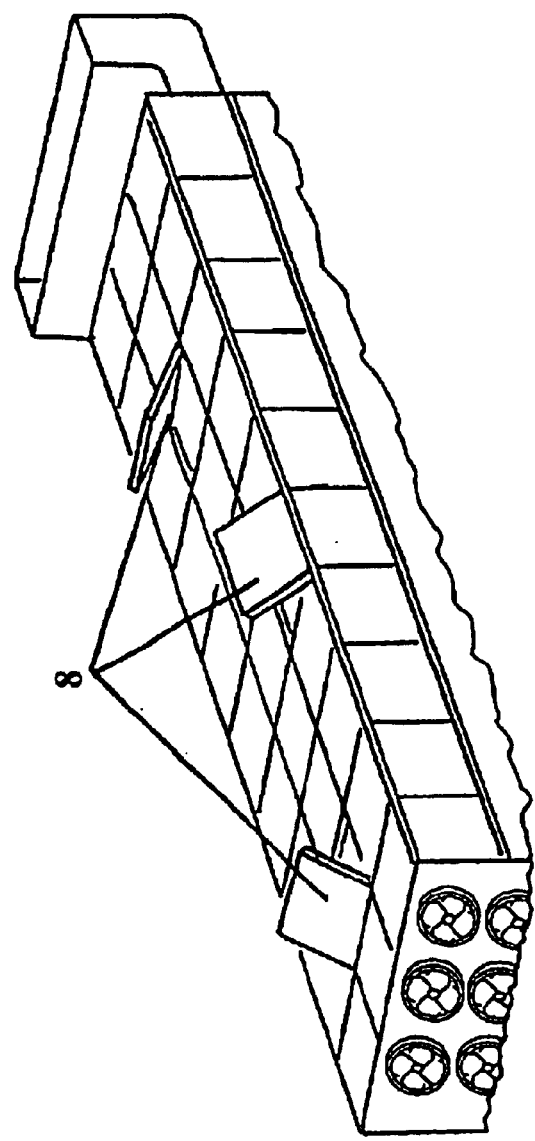
Figure 8:
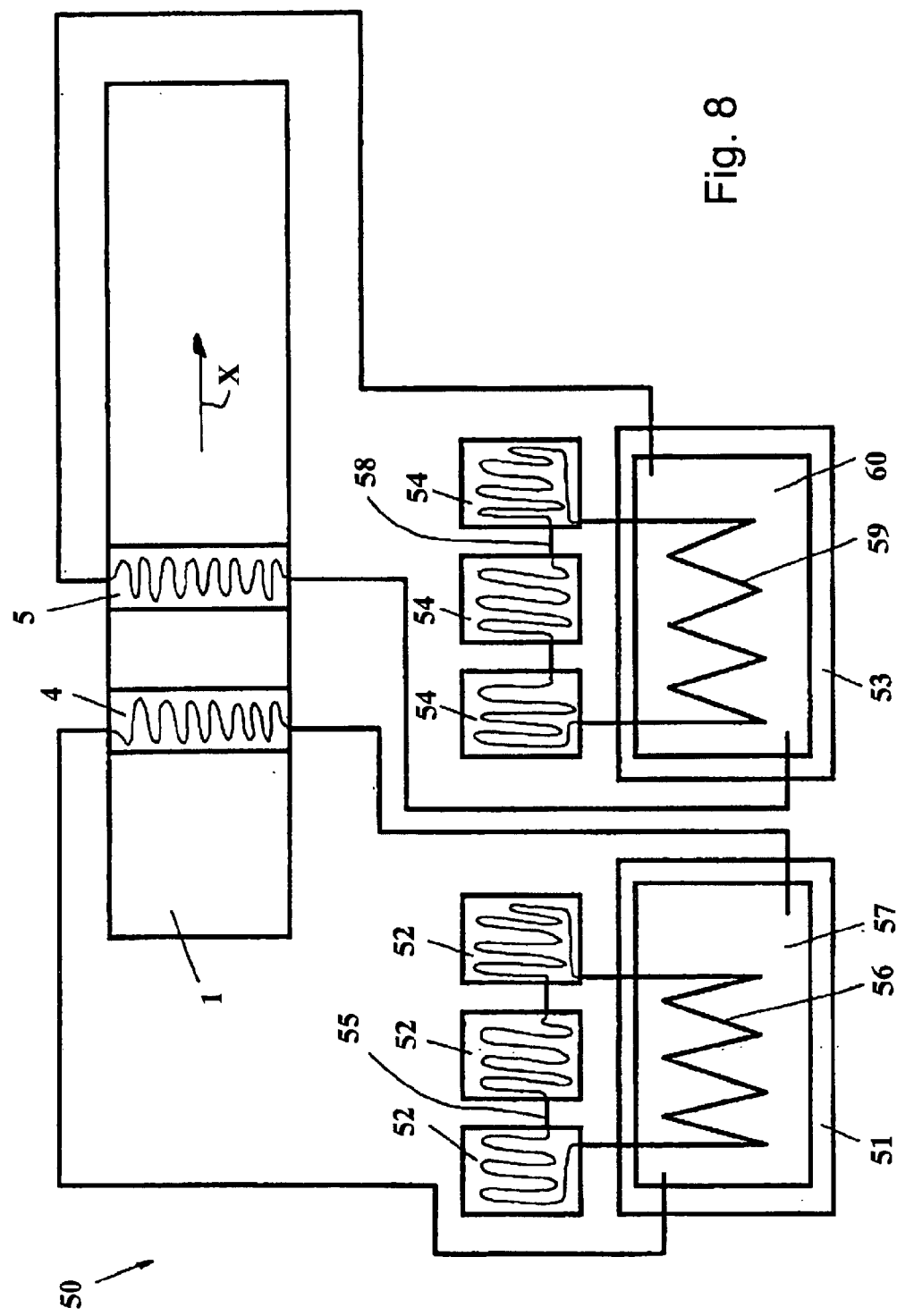
Figure 9:
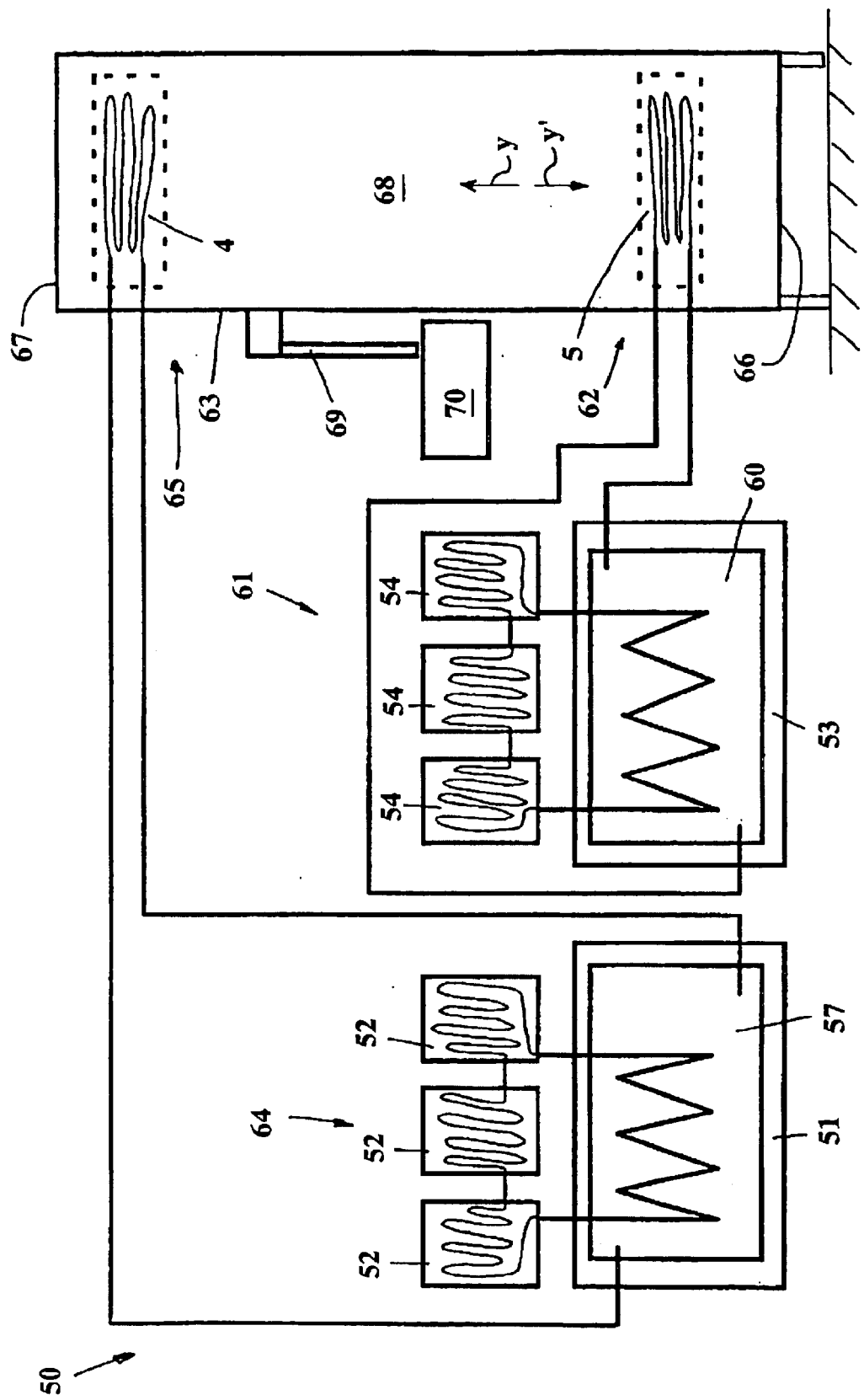

FIG. 1 a perspective general view for the machine/device for the reclamation of atmospheric water, with all externally visible units and subassemblies, FIG. 2 a perspective, partially cut view of the machine/device with the internal fittings installed, FIG. 3 a stylized representation of the continuously variable high-performance blowers, FIG. 4 a stylized representation of the combined cooling and heating registers, FIG. 5 a view of the cooling collectors showing the detail of the cooling fins (ribs), FIG. 6 a stylized representation of the multi-chamber thermo-reservoir, FIG. 7 a view of the solar cells (8) which each can be pivoted by 450, FIG. 8 a schematic diagram of key components of the machine, and FIG. 9 a schematic diagram of a variant of the machine represented partially in FIG. 8.

DESCRIPTION OF THE CONSTRUCTION EXAMPLES

As per the perspective general view in FIG. 1 or the perspective, partially cut view in FIG. 2, the invented machine/device for the reclamation of atmospheric water consists of a water reclamation chamber (1) in the shape of a container or ashlar/parallelepiped, in which all units important to the water reclamation are integrated. The geometric shape of the water reclamation chamber (1) is not fixed on any norm, either in dimension or on variants in the internal and external partitioning. The dimensions (width, height, length) of the water reclamation chamber (1) depend on the required amount of water that has to be reclaimed from the atmosphere.

To make possible a targeted, efficient reclamation of atmospheric water that is calculable in advance, the following units, assemblies and subassemblies, to which also belong measuring and regulating instruments, are prerequisite.

These are: the water reclamation chamber (1), the water reclamation cells (2), the continuously variable high-performance blowers (3), the cooling registers (4), heating registers (5), the cooling collectors (6), the multi-chamber thermo-reservoir (7), the solar collectors (8), the electronic control (10), the large-scale cooling installation (14), the refrigerating machine (15), the cold-water misting nozzles (17), the photo-voltaic power plant (40), the battery station (41) and the emergency backup generator (16).

In the front of the water reclamation chamber (1) are the continuously variable high-performance blowers (3), the air intake openings (36), and the electronic control (10).

Service doors (20) are fitted on the right and the left-hand side of the water reclamation chamber (1). These enable the unhindered access to the water reclamation cells (2) when doing service or assembly work. Located in the rear roof area is the air exit opening (37).

On the roof and away from the water reclamation chamber (1) are the solar collectors (8) and offside the belowground or aboveground multi-chamber thermo-reservoir (7) for the coolants and boiling oils, the photo-voltaic power plant (40), the battery station (41), and the emergency backup generator (16).

The Assemblies of the Machine/Device for Water Reclamation

As per the invention, the water reclamation cell (2) is an independent assembly with all the subassemblies necessary for the water reclamation, as for instance the continuously variable high-performance blowers (3), the combined cooling and heating registers (4, 5). The cooling registers (4) are supplied with coolants which during the nighttime are cooled with cooling collectors (6), are stored out of the way in belowground or aboveground multi-chamber thermo-reservoirs (7) and during the day are fed to the cooling registers (4) with merge valves and dosing pumps. Additional coolant supply, should necessity require it, occurs via a large-scale cooling installation (14) and with cold-water misting nozzles (17). The heating of the heating registers takes place with explosion-proof boiling oils or other heat-accumulating fluids which during the day are heated by the solar collectors (8), are stored out of the way in belowground or aboveground multi-chamber thermo-reservoirs (7) and during the nighttime operation are fed to the heating registers (4) with customary merge valves and dosing pumps. If necessary, the heating registers are supplied by an emergency back-up generator (42). The regulation of the dosing pumps with which the coolants and the explosion-proof boiling oils or other heat-accumulating fluids are transported into the cooling registers (4) or heating registers (5) is performed by the electronic control (10). The circulation of the coolants or of the explosion-proof boiling oils or other heat-accumulating fluids between the cooling collectors (6) or the solar collectors (8) and belowground or aboveground multi-chamber thermo-reservoirs occurs by means of customary circulating pumps. Further parts of the equipment of the water reclamation cell (2) include the measuring and regulation instruments (temperature and other sensors etc.) necessary to the temperature regulation. For the effective reclamation of atmospheric water, several, serially connected water reclamation cells (2) are required. All data acquired in the interior of the water reclamation cell (2) are transferred to the electronic control (10), where they are interpreted and converted for the further water reclamation process.

The continuously variable high-performance blowers (3) are among the most important units of the machine/device as they transport the necessary air current, which makes possible a steady reclamation of atmospheric water, into the interior of the water reclamation chamber (1) and furthermore into the individual water reclamation cells (2). They are located on the front of the water reclamation chamber (1) and in the interior of the individual water reclamation cells (2). The continuous adjustability of the high-performance blowers (3) is among the most important prerequisites for a targeted and in advance calculable reclamation of atmospheric water. With the continuously variable high-performance blowers (3) on the front side of the water reclamation chamber (1), great volumes of humid air masses are transported into the first water reclamation cell (2) and there are partially dehumidified. The onward transport into the subsequent water reclamation cells (2) for post-dehumidification of the air masses is done by the continuously variable high-performance blowers (3), which are located in the interior of each succeeding water reclamation cell (2) (see FIGS. 1 and 2). The continuously variable high-performance blowers (3) in the interior of the water reclamation cell (2) suck in the air flow from the previous cooling/heating register (4, 5) and transport it to the subsequent cooling/heating register (4, 5).

When the relative air humidity rises, the revolutions speed of the continuously variable high-performance blowers (3) is reduced or one or two high-performance blowers (3) are turned off. If on the other hand the relative air humidity decreases, either the revolutions speed of the continuously variable high-performance blowers (3) is increased or one or two more high-performance blowers (3) are turned on. Thereby the volume of the airflow and thus the water amount that was supposed to be extracted from the atmosphere, as calculated in advance, always remains uniform. The energy is supplied by photo-voltaic installations (40).

The entire process is monitored and controlled by the electronic regulation (10). Malfunctions or possible outages of high-performance blowers (3) are transmitted via radio by the electronic regulation to the operational control room.

The coils, bearings, and gaskets of the continuously variable high-performance blowers (3) were specifically designed for the rigorous longtime use under extreme weather conditions in tropical and subtropical regions.

Annotation Concerning the Physical Process for the Reclamation of Atmospheric Water It is a law of physics that the warm relative air humidity always condenses at the coldest point. In contrast, the cold relative air humidity always condenses at the warmest point. Prerequisite is that a temperature difference of about 20° C. is created between in front of the machine/device and inside the machine/device. That is the basis for the functional principle of the machine/device for the reclamation of atmospheric water in day-and-night-operation.

EXAMPLE

The water content in one cubic meter (35.316 cu ft) of air, at a temperature of 55° C. (131° F.) and a relative air humidity of 90% moves at approximately 0.06 kg (0.1323 lbs). That means that for 1,000 liter reclaimed water per hour approximately 16.666 $m^3$ (588.58 $ft^3$) of air have to be dehumidified.

The combined cooling and heating registers as per the invention (4, 5) which are located in the water reclamation cells (2), consist of a bicameral system. They were designed for the bi-functional 24-hour day-and-night-operation. The coolants for the cooling registers (4) are cooled during the night with cooling collectors (6), are stored out of the way in aboveground or belowground multi-chamber thermo-reservoirs (7), and from there are fed during the day to the cooling registers (4) by means of merge valves and dosing pumps. Should it become necessary, a large-scale cooling installation (14) and further cold-water misting nozzles (17) are run in addition. The heating of the heating registers (5) occurs with explosion-proof boiling oils or other heat-accumulating fluids that are heated during the day by solar collectors, are stored out of the way in belowground or aboveground multi-chamber thermo-reservoirs (7), and are fed during the nighttime operation to the heating registers by means of merge valves and dosing pumps. The entire cooling and heating process is monitored and controlled by the electronic regulation (10).

Through the combination of cooling and heating registers (4, 5), inevitably the surface cross-section is enlarged. That means during daytime operation the cooling register is forcibly cooled and during the nighttime operation the heating register is forcibly heated. The result of the enlarged surface cross-section means an additional, increased, reclaimed amount of water.

The changeover from daytime to nighttime operation and vice versa is controlled by sensors and happens through the electronic regulation (10). The dimensions of the combined cooling and heating registers correlate to the measurements of the performance-related water reclamation cell (2). For regions in which during the day there is only little relative air humidity or none at all, and if the use of cooling systems would be too expensive, only heating registers (5) are recommended. For in these regions there is a very high relative air humidity during the nighttime.

The Assembly: Cooling Collectors (6) and the Multi-Chamber Thermo-Reservoir (7)

The cooling collectors (6) and the belowground or aboveground offside multi-chamber thermo-reservoir (7), as laid out in the invention, form an independent assembly which for the reclamation of atmospheric water supplies the cooling registers (6) with coolants during the day when the temperature rises to nearly 131° F. (55° C.) and the relative air humidity to approximately 100%.

So as to increase the surface cross-section and the cooling capacity, the cooling collectors (6) are equipped with cooling fins (ribs) (19). The cooling collectors (6) and the multi-chamber thermo-reservoir (7) are individually adapted in size and volume to any water reclamation demand and can also be run apart from the installation. During the day, the cooling collectors (6) have to be protected from UV-radiation with coverings (43), so as to avoid an overheating of the coolants. If there are fluids that can be used both at high and at low temperatures, then these are to be used. Customary circulating pumps perform the circulation of the coolants between the cooling collectors (6) and the multi-chamber thermo-reservoir(s) (7). The transport of the coolants from the multi-chamber thermo-reservoir(s) (7), which can be located aboveground as well as belowground, to the cooling registers (4) is performed by customary merge valves and dosing pumps. Should for atmospheric or technical reasons the coolant supply not suffice, the electronic regulation inevitably turns also the large-scale cooling installation (14) on and, at further demand, the cold water misting nozzles (17) as well. The entire temperature regulation, the control of the dosing and circulating pumps, including all switching and flow processes for the daytime and nighttime operation, is performed by the electronic regulation (10). The Assembly: Solar Collectors (8) and the Multi-Chamber Thermo-Reservoir (7)

The solar collectors (8) and the aboveground or belowground multi-chamber thermo-reservoir (7) likewise form an independent assembly which, for the reclamation of atmospheric water, supplies the heating registers (5) with explosion-proof heating oils or other heat-accumulating fluids during the nighttime when the temperatures drop to nearly 41° F. (5° C.) and the relative air humidity rises to approximately 100%.

The explosion-proof boiling oils or other heat-accumulating fluids are heated during the day with solar collectors (8) and are transported with circulating pumps into multi-chamber thermo-reservoirs (7). Circulating pumps perform the circulation of the explosion-proof boiling oils or other heat-accumulating fluids. Should that be necessary, the heating registers (5) are supplied by an emergency backup generator (42).

The solar collectors (8) and the multi-chamber thermo-reservoirs (7) are individually adapted in size and volume to any water reclamation demand and can also be run apart from the installation. A mechanical, electrical, or hydraulic mechanism makes it possible that the solar collectors follow the course of the sun by 135°, in steps of 45° at a time, and thus increase the energy output considerably.

During the night the solar collectors have to be covered with an insulated casing, so as to avoid a super-cooling of the boiling oils or other heat-accumulating fluids. If there are fluids that can be used both at high and at low temperatures, then these are to be used. Customary circulating pumps perform the circulation of the boiling oils or other heat-accumulating fluids from the solar collectors (8) to the multi-chamber thermo-reservoir(s) (7), which can be located aboveground as well as belowground. The multi-chamber thermo-reservoirs (7) can be filled both with coolants and with boiling oils or other heat-accumulating fluids. Customary merge valves and dosing pumps perform the transport of the boiling oils or other heat-accumulating fluids from the multi-chamber thermo-reservoir (7) to the heating registers (5).

The entire temperature regulation, the control of the dosing and circulating pumps, including all switching and flow processes for the daytime and nighttime operation, is performed by the electronic regulation (10).

The freely programmable electronic regulation (10) as laid out in the invention was designed specifically for use in installations for the reclamation of atmospheric water. Computerized, it monitors, on several channels, all functions, calculates and analyzes target values and actual values and regulates all control processes according to base values, in the interior as well as the exterior of the installation. It switches from nighttime to daytime operation and vice versa. It can be operated manually and by remote control.

The amount of water that is to be extracted is preprogrammed in cubic meter/hour ($m^3/h$). Then all further steps are performed automatically by the electronic regulation. The relative air humidity and the outside temperature are measured, likewise the temperature in the water reclamation cells (2) and the cooling and heating registers (4, 5). Then takes place the calculation of the necessary airflow, the rotation speed of the continuously variable high-performance blowers (3) in front of and inside the machine/device.

During the nighttime, the coolant temperature is monitored and regulated in the cooling collectors (6) and in the coolant thermo-reservoir (7). Should it become necessary, the large-scale cooling installation (14) and the refrigerating machine (15) are also turned on and adapted to the pre-set values.

Also measured are the temperature of the explosion-proof boiling oils or other heat-accumulating fluids in the thermo-reservoirs (9), the heat values of the solar collectors (8), and the flow rate of the dosing pumps during the nighttime operation.

If during the daytime operation the relative air humidity and the external temperature rise, the rotation speed of the continuously variable high-performance blowers (3) is reduced or some are turned off. Parallel to this, the cooling performance is increased. When relative air humidity and temperatures decrease, the rotation speed of the continuously variable high-performance blowers (3) is increased, some are added, and the cooling performance reduced. This process repeats itself during the nighttime operation inversely when the cool, humid air masses have to be heated. Likewise, the amount of extracted water is measured. If it is too low, some more continuously variable high-performance blowers (3) are turned on or their rotation speed is increased and the cooling or heating is adapted to the measured values.

Likewise, the amount of extracted water is recorded. If it is too low, some more continuously variable high-performance blowers (3) are turned on or their rotation speed and the cooling or heating is increased. The temperature and the relative air humidity at the air exit opening (36) always has to be kept constant, it must neither fall below nor exceed the tolerance range. Also monitored and controlled is the photo-voltaic installation with the appendant battery station which supplies the energy for the continuously variable high-performance blowers (3), the dosing and circulating pumps and the measuring and regulating instruments.

All ascertained data are recorded, as are any dysfunctions, and transmitted by radio to the operational control room, which is also able to intervene in the operating procedure. During assembly and service work, the freely programmable, electronic regulation (10) is run manually.

The cold-water misting nozzles (17) are only used during daytime operation and serve as emergency backup in order to maintain the temperature difference of approximately 20° C. in the interior of the water reclamation cell (2) for the additional chill-shock, when the coolant supplies in the multi-chamber thermo-reservoir (7) no longer suffice.

The water treatment for the cold-water misting nozzles (17) occurs through a refrigeration machine (15). The necessary water is taken from the water collection tank in allotments. The energy supply occurs through a photo-voltaic installation (40), a battery station (41), or through an emergency backup generator (42). The control of the regulating and switching operations is performed by the electronic regulation (10).

The photo-voltaic installation (40) and the battery station (41) form an independent assembly. The purpose of the photo-voltaic installation (40) is to supply the continuously variable high-performance blowers (3), the electronic regulation (10), the dosing and circulating pumps, and the measuring and regulating instruments with energy.

At least two photo-voltaic installations (40) with a capacity of 50 kWh should be used. The second photo-voltaic installation (40) supplies the battery station (41) during the day with energy which is needed for the nighttime operation of the machine/device. The battery station is construed in such a way that the energy supply for the variable high-performance blowers (3), the electronic regulation (10), the dosing and circulating pumps, and the measuring and regulating instruments lasts from sundown to sunrise and still has reserves. Prior to being fed into the machine/device, the energy is transformed from direct current to alternating current.

With advancing technology the machines/devices are run 100% with energy from photo-voltaic installations (40).

Annotation: Dosing and circulation pumps, merge valves, measuring, controlling and regulating instruments are bought-in parts customary in trade and not described in detail.

The Function of the Machine/device for the Reclamation of Atmospheric Water

Prerequisite for a successful, efficient and in advance calculable reclamation of atmospheric water is a temperature difference of about 20° C. between the external temperature and the temperature in the water reclamation cells (2). At this temperature difference, the dew point occurs and the relative air humidity condenses during the day at approximately 55° C. (131° F.) with a relative air humidity of about 90% on the cooling registers at the coldest point, and during the night at approximately 5° C. (41° F.) with a relative air humidity of about 100% on the heating registers at the warmest point.

The percentage rate of the relative air humidity is the basis for calculating the volume of the airflow, which is transported by continuously variable high-performance blowers (3) into the first water reclamation cell (2) and led by means of continuously variable high-performance blowers (3) through the subsequent ones for further dehumidification. A complete dehumidification is not intended, since it would be out of all proportion to the energy input.

The coolants for the cooling registers (4) for the daytime operation are cooled during the nighttime at temperatures around 5° C. (41° F.) with cooling collectors and stored in the aboveground or belowground multi-chamber thermo-reservoirs (7). Should the coolants during daytime operation not suffice, an additional large-scale cooling installation (14) is turned on. In addition, cold-water misting nozzles (17) can be turned on as well, which increase the chill-shock and whose water is treated by a refrigerating machine (15). The water for the cold-water misting nozzles (17) is taken from the water collection tank (18). During nighttime operation, the heating registers (5) are heated with explosion-proof boiling oils or other heat-accumulating fluids. The fluids are heated during the day with solar collectors (8), are stored in aboveground or belowground multi-chamber thermo-reservoirs (7) and are transported during the nighttime operation with dosing pumps to the heating registers.

With the use of two photovoltaic installations (40) with 50 kWh each and a battery station (41) for the energy supply during nighttime operation, the machine/device can be run network-independent in 24-hour day-and-night operation.

In conclusion, the humidity content and the air temperature is measured at the air exit opening (36).

The water thus extracted is channeled into one or several water collection tanks and from there transferred to the different consumer positions.

The changeover from nighttime to daytime operation takes place via the electronic regulation (10).

Annotation: The warm relatively humid air masses always condense on the coldest point. The cold relatively humid air masses always condense on the warmest point.

FIG. 8 shows a schematic depiction of key components of a water reclamation installation 50. In detail, a water reclamation chamber 1 with a cooling register 4 and a heating register 5, a cold reservoir 51, cooling collectors 52, a heat reservoir 53, and heating collectors 54 are depicted. Through the cooling collectors 52 flows a medium 55, which transmits the accumulated coldness via a heat exhanger 56 to a cooling agent 57 located in the cold reservoir 51. Through the heating collectors 54 flows a medium 58, which transmits the accumulated heat via a heat exchanger 59 to a heating agent 60 located in the reservoir 53. The medium 55 cools down at night by flowing through the cooling collectors 52. The medium 58 warms up during the day by flowing through the heating collectors 54. For the purpose of dehumidification of ambient air, an air current in arrow direction x is created by means of non-depicted blowers. The air flowing through the water reclamation chamber 1 is cooled at the cooling register 4 and dehumidified whereby the water discharging from the air is channeled into a collection device that is not shown. The cooling of cooling register 4 occurs by means of the coolant 57 which is taken from the cold reservoir 5 and returned to it whereby the coolant, after flowing through the cooling register 4, shows an elevated temperature. The heating register 5, which is operated via heat reservoir 53 through heating agent 60, functions analogously.

FIG. 9 shows a construction variant of the water reclamation installation shown in FIG. 8. Through the heat reservoir 53 and the heat collectors 54 a heating unit 61 is formed which by means of heating agent 60 supplies that heating register 5 located in a lower area 62 of a tower 63. Heat collectors 54 are solar collectors through which a medium flows for heat transport. A cooling unit 64 is formed through cold reservoir 51 and the cooling collectors 52, which by means of cooling agent 57 supply cooling register 4 located in an upper area 65 of tower 63. The tower (or chimney) 63 is designed with openings in a bottom side 66 and a top side 67. The operation of the tower 63 occurs at night when the ambient air is cool. Through the heating of heating register 5 in the lower area 62 of tower 63, an upwind current in arrow direction y is created in an interior room 68. This has the effect that large air masses flow past the chilled cooling register 4 located in the upper area 65 of tower 63 and that there the flowing air is dehumidified through cooling, whereby the water is collected in the upper area 65 of tower 63 and is channeled from tower 63 through a pipeline 69 in a collection container 70. For the operation of the tower it is of course necessary that the cooling register 4 have a temperature that is so far below the temperature of the flowing air that condensation takes place. According to a non-depicted construction variant the tower is intended to run at night as a solar chimney (or upwind) power station.

With such an operation, only the heating register is used and in the upper area of the tower a propeller is located which powers an electric generator. Furthermore it is also conceivable to run the tower during the day as a descending wind power station by running a cooling register which cools the air in the tower and causes it to flow in arrow direction y.

The water reclamation installation, as laid out in the invention, is not restricted to the depicted and described construction examples (embodiments), construction characteristics and geometrical depictions. Rather, it encompasses also all professional continuing developments within the scope of the idea underlying the invention. Pumps, valves and pipelines are bought-in parts customary in trade and therefore were not further described or shown.

REFERENCE LIST 1 water reclamation chamber
2 water reclamation cell
3 high-performance blowers
4 cooling register
5 heating register
6 cooling collector
7 multi-chamber thermo-reservoir
8 solar collector
9 multi-chamber thermo-reservoir
10 regulation
11
12
13
14 large-scale cooling installation
15 refrigerating machine
16 emergency backup generator
17 cold water misting nozzles
18 water collection tank
19 cooling fins (ribs)
20 service door
24 thermo chamber
25 heat exchanger
36 air intake opening
37 air exit opening
40 photovoltaic equipment
41 battery station
42 emergency backup generator
43 cover
50 water reclamation installation
51 cooling reservoir
52 cooling collector
53 heat reservoir
54 heat collector
55 medium
56 heat exchanger
57 coolant
58 medium
59 heat exchanger
60 heating agent
61 thermal unit
62 lower area
63 tower
64 cooling unit
65 upper area
66 bottom side
67 top side
68 interior
69 pipeline
70 collection container

What is claimed is:

1. Method for reclamation of atmospheric water with a water reclamation chamber (1) with water reclamation cells (2) and variable high-performance blowers (3), the method comprising:

cooling a coolant (57) stored in a cooling reservoir (7, 51) during nighttime operation, by means of cooling collectors (6, 52), and heating a heat-accumulating fluid (60) stored in a heat reservoir (53) during daytime operation by means of solar collectors (8, 54), wherein the coolant that is cooled during the night for the purpose of water reclamation cools, by day and/or night, cooling registers through which air flows, and wherein, at said cooling registers, air is dehumidified, whereby the heat-accumulating fluid (60) by day and/or by night is used for the generation of energy for the operation of equipment (50) and/or for the extraction of water, wherein there occurs, during nighttime operation, a removal of humidity from cool air masses of high humidity in particular through heating of combined cooling registers (4) and heating registers (5).

2. Method according to claim 1, wherein during the daytime and/or nighttime operation a removal of humidity occurs from hot or cool air masses that are present in an environment through cooling of the air masses at cooling register (4).

3. Method according to claim 1, wherein an energy supply of electric users such as high-performance blowers (3), dosing and circulating pumps, merge valves, measuring and regulating instruments, is provided through photo-voltaic equipment (40) whereby the energy attained through the photo-voltaic equipment (40) is stored in particular in batteries (41).

4. Method for reclamation of atmospheric water with a water reclamation chamber (1) with water reclamation cells (2) and variable high-performance blowers (3), the method comprising:

cooling a coolant (57) stored in a cooling reservoir (7, 51) during nighttime operation, by means of cooling collectors (6, 52), and heating a heat-accumulating fluid (60) stored in a heat reservoir (53) during daytime operation, by means of solar collectors (8, 54), wherein the coolant that is cooled during the night for the purpose of water reclamation cools, by day and/or night, cooling registers through which air flows, and wherein, at said cooling registers, air is dehumidified, whereby the heat-accumulating fluid (60) by day and/or by night is used for the generation of energy for the operation of equipment (50) and/or for the extraction of water, with a water reclamation chamber (1) shaped like a container, rectangle or parallelepiped, in which are located several water reclamation cells (2) and into which great volumes of humid air masses are transported by means of continuously variable high-performance blowers (3), whereby, through the use of combined cooling and heating registers (4, 5), during the daytime humidity is extracted from great volumes of hot air masses through cooling and during the nighttime operation through heating, whereby during the nighttime the coolant (57) is cooled cooling collectors (6, 52) and is stored particularly out of the way in aboveground or belowground in multi-chamber thermo-reservoirs (7) and during the day, by means of solar collectors (8, 54), the explosion-proof boiling oils or other heat-accumulating fluids (60) are heated and stored particularly out of the way in aboveground or belowground in multi-chamber thermo-reservoirs (7, 51, 53), whereby the multi-chamber thermo-reservoirs (7, 51, 53) are intended both for coolants (57) and for explosion-proof boiling oils or other heat-accumulating fluids (60), an electronic regulation (10) monitors and/or regulates and/or controls all operational and switching activities inside and outside the installation (50), and the energy supply of the continuously variable high-performance blowers (3) in particular, of the dosing and circulating pumps, of the merge valves and the measuring and regulating instruments occurs via the photo-voltaic equipment (40) whereby a associated battery station (41) which during the day is supplied with electricity by the photo-voltaic equipment (40) and which supplies the energy for the nighttime operation and whereby as a contingency a large-scale cooling installation (14) is intended and a refrigerating machine (15) for the operation of additional cold water misting nozzles (17) and for the supply of the cooling registers (57), and furthermore in particular an emergency backup generator (42) heats in case of an emergency in multi-chamber thermo-reservoirs (7, 51, 53) the explosion-proof boiling oils or other heat-accumulating fluids (60) which are intended for the operation of the heating registers (5).

5. Device for execution of the method of claim 4, wherein the heat-accumulating fluid comprises explosion-proofed boiling oil.

6. Device for the execution of a method for reclamation of atmospheric water with a water reclamation chamber (1) with water reclamation cells (2) and variable high-performance blowers (3), the method comprising:

cooling a coolant (57) stored in a cooling reservoir (7, 51) during nighttime operation, by means of cooling collectors (6, 52), and heating a heat-accumulating fluid (60) stored in a heat reservoir (53) during daytime operation, by means of solar collectors (8, 54), wherein the coolant that is cooled during the night for the purpose of water reclamation cools, by day and/or night, cooling registers through which air flows, and wherein, at said cooling registers, air is dehumidified, whereby the heat-accumulating fluid (60) by day and/or by night is used for the generation of energy for the operation of equipment (50) and/or for the extraction of water, wherein the entire installation, in particular the high-performance blowers (3), dosing and circulating pumps, merge valves, measuring and regulating instruments are regulated and/or controlled through electronic regulation, and wherein in case of an emergency a large-scale cooling installation (14) and a refrigerating machine (15) are available for additional cold water misting nozzles (7) which supplies the cooling registers (4) with coolant and that through an emergency backup generator (16) the fluid in the in multi-chamber thermo-reservoirs (53) is heated.

7. Device according to claim 6, wherein the cooling registers (4) are designed as combined cooling registers (4) and heating registers (5).

8. Device according to claim 6, wherein die coolants are stored in aboveground and/or belowground multi-chamber thermo-reservoirs (7).

9. Device according to claim 6, wherein the heat-accumulating fluid (60) is stored in multi-chamber thermo-reservoirs (53).

10. Device according to claim 6, wherein the water reclamation chamber (1) in the shape of a container, rectangle, or parallelepiped, contains all units necessary to the reclamation of atmospheric water: cooling and heating registers (4, 5), continuously variable high-performance blowers (3), measuring and regulating instruments.

11. Device according to claim 6, wherein, for the effective, targeted and in advance calculable reclamation of atmospheric water several water reclamation cells (2) are serially connected.

12. Device according to claim 6, wherein, in the front of the device, several continuously variable high-performance blowers (3) are installed in the air intake openings (36) with which the humid air masses are transportable into the water reclamation cells.

13. Device according to claim 6, wherein, for the water reclamation in the day-and-night-operation of the installation (50) combine heating registers (4) and cooling registers (5) are used.

14. Device according to claim 6, wherein the heating registers (5) during daytime operation are forcibly cooled by the cooling registers (4) and during the nighttime operation the cooling registers (4) are forcibly heated by the heating registers (5).

15. Device according to claim 6, wherein the low temperature prevailing during the night cools the coolants in the offside cooling collectors (6) with which the cooling registers are supplied during the daytime operation.

16. Device according to claim 6, wherein the cooling collectors (6) are equipped with additional cooling fins (19) to enlarge the surface cross section and to increase cooling efficiency.

17. Device according to claim 6, wherein the heat-accumulating fluid during the day is heated by solar collectors (8), which are also at some distance from the installation, and can be fed to the heating registers during the night.

18. Device according to claim 6, wherein multi-chamber thermo-reservoirs (7) provide storage for coolants (57) or explosion-proof boiling oils or other heat-accumulating fluids (60).

19. Device according to claim 6, wherein in the individual thermo-chambers (24) different temperatures prevail, so that the cooling and heating agents (57, 60) are always uniformly fed to the heating and cooling registers (4, 5) at the prescribed temperature difference of approximately 200 C (680 F), whereby the cooling or heating takes place with radiator coils or area heat exchangers (25) and whereby this process is controlled electronically via merge valves.

20. Device according to claim 6, wherein the multi-chamber thermo-reservoirs (7, 51, 53) are also arrayed apart from the installation (50).

21. Device according to claim 6, wherein the heat-accumulating fluids (60) which are heated by the solar collectors (8, 54) are stored in belowground or aboveground multi-chamber thermo-reservoirs (7, 53).

22. Device according to claim 6, wherein the humid air masses enter the water reclamation cells (2) at the front side through the air intake openings (36), and exit these cells dehumidified at the rear part of the roof through the air exit openings (37).

23. Device according to claim 6, further comprising cold water misting nozzles (17) arrayed in the area of the cooling registers (4).

24. Device according to claim 6, wherein through the use of several serially connected water reclamation cells (2) in connection with continuously variable high-performance blowers (3), a targeted, effective and in advance calculable reclamation of atmospheric water takes place.

25. Device according to claim 6, further comprising left and right side service doors (20) which allow trouble-free access to the water reclamation cells (2) during service or maintenance work.

26. Device according to claim 6, wherein the solar collectors (8, 52, 54) can be pivoted mechanically, electronically, or hydraulically by 45° at a time up to a total of 315°.

27. Device according to claim 6, wherein photo-voltaic equipment (40) supplies the device with necessary energy.

28. Device according to claim 27, wherein energy which is supplied by the photo-voltaic installations (40) and which is necessary for the nighttime operation of the installation is stored in one or several battery stations.

29. Device according to claim 6, wherein an emergency back-up generator (42) heats the heat-accumulating fluid (60) in case the solar cells (8, 53) fail.

30. Device according to claim 6, wherein the installation for the water reclamation is designed in the shape of a container, rectangle, or parallelepiped.

31. Device according to claim 6, wherein a multi-channel regulation, which was specifically developed for this purpose, controls, regulates, and monitors all operational and switching activities inside and outside the installation and reports possible malfunctions directly by radio to an operational control room.

32. Device for the execution of a method for reclamation of atmospheric water with a water reclamation chamber (1) with water reclamation cells (2) and variable high-performance blowers (3), the method comprising:

cooling a coolant (57) stored in a cooling reservoir (7, 51) during nighttime operation, by means of cooling collectors (6, 52), and heating a heat-accumulating fluid (60) stored in a heat reservoir (53) during daytime operation, by means of solar collectors (8, 54), wherein the coolant that is cooled during the night for the purpose of water reclamation cools, by day and/or night, cooling registers through which air flows, and wherein, at said cooling registers, air is dehumidified, whereby the heat-accumulating fluid (60) by day and/or by night is used for the generation of energy for the operation of equipment (50) and/or for the extraction of water, wherein the entire installation, in particular the high-performance blowers (3), dosing and circulating pumps, merge valves, measuring and regulating instruments are regulated and/or controlled through electronic regulation, wherein in each water reclamation cell (2) at least one combined cooling register (4) and one heating register (5) is installed, and several continuously variable high-performance blowers (3) come into operation and in particular also regulating, controlling and measuring instruments are installed.

33. Device for the execution of a method for reclamation of atmospheric water with a water reclamation chamber (1) with water reclamation cells (2) and variable high-performance blowers (3), the method comprising:

cooling a coolant (57) stored in a cooling reservoir (7, 51) during nighttime operation, by means of cooling collectors (6, 52), and heating a heat-accumulating fluid (60) stored in a heat reservoir (53) during daytime operation, by means of solar collectors (8, 54), wherein the coolant that is cooled during the night for the purpose of water reclamation cools, by day and/or night, cooling registers through which air flows, and wherein, at said cooling registers, air is dehumidified, whereby the heat-accumulating fluid (60) day and/or by night is used for the generation of energy for the operation of equipment (50) and/or for the extraction of water, wherein the entire installation, in particular the high-performance blowers (3), dosing and circulating pumps, merge valves, measuring and regulating instruments are regulated and/or controlled through electronic regulation, wherein the humid air masses flow horizontally through the voluminous, rectangular, and extremely humidity-absorbing cooling registers (4) and heating registers (5).

34. Device for the execution of a method for reclamation of atmospheric water with a water reclamation chamber (1) with water reclamation cells (2) and variable high-performance blowers (3), the method comprising:

cooling a coolant (57) stored in a cooling reservoir (7, 51) during nighttime operation, by means of cooling collectors (6, 52), and heating a heat-accumulating fluid (60) stored in a heat reservoir (53) during daytime operation, by means of solar collectors (8, 54), wherein the coolant that is cooled during the night for the purpose of water reclamation cools, by day and/or night, cooling registers through which air flows, and wherein, at said cooling registers, air is dehumidified, whereby the heat-accumulating fluid (60) by day and/or by night is used for the generation of energy for the operation of equipment (50) and/or for the extraction of water, wherein the entire installation, in particular the high-performance blowers (3), dosing and circulating pumps, merge valves, measuring and regulating instruments are regulated and/or controlled through electronic regulation, wherein a large-scale cooling installation (14), a refrigerating machine (15), and the water tanks (16) are positioned on the bottom of or apart from the device for water reclamation.

* * * * *